(12) United States Patent
Yokoyama

(10) Patent No.: US 12,482,883 B2
(45) Date of Patent: Nov. 25, 2025

(54) POWER STORAGE DEVICE

(71) Applicant: Prime Planet Energy & Solutions, Inc., Tokyo (JP)

(72) Inventor: Yoshinori Yokoyama, Tokushima (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 503 days.

(21) Appl. No.: 17/991,789

(22) Filed: Nov. 21, 2022

(65) Prior Publication Data

US 2023/0198063 A1    Jun. 22, 2023

(30) Foreign Application Priority Data

Dec. 21, 2021 (JP) ................... 2021-207509

(51) Int. Cl.
| | |
|---|---|
| *H01M 50/14* | (2021.01) |
| *H01M 10/0587* | (2010.01) |
| *H01M 50/102* | (2021.01) |
| *H01M 50/147* | (2021.01) |

(52) U.S. Cl.
CPC ....... *H01M 50/14* (2021.01); *H01M 10/0587* (2013.01); *H01M 50/102* (2021.01); *H01M 50/147* (2021.01); *H01M 2220/20* (2013.01)

(58) Field of Classification Search
CPC .. H01M 50/14; H01M 50/102; H01M 50/147; H01M 10/0587; H01M 2220/20
See application file for complete search history.

(56) References Cited

FOREIGN PATENT DOCUMENTS

| | | |
|---|---|---|
| CN | 206742372 U | 12/2017 |
| JP | 2006-066319 A | 3/2006 |
| JP | 2014-038706 A | 2/2014 |
| JP | 2021150052 A | 9/2021 |

OTHER PUBLICATIONS

Translation JP201438706 (Year: 2014).*

* cited by examiner

*Primary Examiner* — Jane J Rhee
(74) *Attorney, Agent, or Firm* — HAUPTMAN HAM, LLP

(57) ABSTRACT

A power storage device in which an electrode body is housed in a can is provided with a movement restricting member including an electrode-body bonding portion placed in the can and bonded to a fixing surface of a thickness-direction outside surface located outside in a thickness direction of an electrode sheet, out of outer surfaces of the electrode body, and a can fixing portion that extends from the electrode-body bonding portion and is fixed to the can to restrict movement of the electrode body in the can.

2 Claims, 4 Drawing Sheets

POWER STORAGE DEVICE

CROSS-REFERENCE TO RELATED APPLICATIONS

This application is based upon and claims the benefit of priority to Japanese Patent Application No. 2021-207509 filed on Dec. 21, 2021, the entire contents of which are incorporated herein by reference.

BACKGROUND

Technical Field

The present disclosure relates to a power storage device in which an electrode body is housed in a can.

Related Art

Conventionally, as power storage devices, such as batteries and capacitors, there are known power storage devices in which an electrode body is housed in a cylindrical or rectangular box-shaped can, or casing. A positive terminal and a negative terminal of the power storage device are each fixedly provided in the can in an electrically insulated state, and they are electrically connected to the electrode body inside the can. For example, Japanese unexamined patent application publication No. 2021-150052 (see FIG. 1 and others) discloses such a battery configured as above.

SUMMARY

Technical Problems

If the power storage device is subjected to external strong impacts or shocks, e.g., if a vehicle equipped with this power storage device collides against an object, the electrode body housed in the can may significantly move, or become displaced. This movement may cause damage to the connected portions of the electrode body with the positive and negative terminals and may deform or damage the electrode body itself due to collision with the inner surface of the can or the internal components, constituting a current shutoff mechanism or the like, arranged inside the can. There is also a risk of deformation of the can and damage to the internal components.

The present disclosure has been made to address the above problems and has a purpose to provide a power storage device capable of restricting movement of an electrode body in a can even if the power storage device is subjected to external shocks, thereby preventing damages to the electrode body, the can, and others.

Means of Solving the Problems

To achieve the above-mentioned purpose, one aspect of the present disclosure provides a power storage device comprising: a can; an electrode body housed in the can, the electrode body including electrode sheets; and wherein the electrode body has outer surfaces including a thickness-direction outside surface located outside in a thickness direction of the electrode sheets, and the power storage device further comprises: a movement restricting member placed in the can, the movement restricting member including: an electrode-body bonding portion bonded to a fixing surface that is at least a part of the thickness-direction outside surface; and a can fixing portion that extends from the electrode-body bonding portion and is fixed to the can to restrict movement of the electrode body in the can.

The foregoing power storage device is provided with the movement restricting member including the electrode-body bonding portion and the can fixing portion. In this power storage device, accordingly, even if the power storage device is subjected to external shocks or impacts, the electrode body is restricted from moving in the can. This configuration can prevent the electrode body from colliding against the inner wall surface of the can, any components constituting a current shutoff mechanism located in the can, and others, thereby preventing damages to the electrode body, the can, and the components in the can.

The movement restricting member preferably has sufficient rigidity and dimensions, such as thickness, not to easily cause deformation even if the power storage device is subjected to external strong shocks or impacts. The material of the movement restricting member may include for example insulating resin, such as polypropylene, polyethylene, and PET.

The power storage device may include for example a rectangular, or prismatic, power storage device in which a rectangular parallelepiped or nearly rectangular parallelepiped electrode body is housed in a rectangular parallelepiped box-shaped can, a cylindrical power storage device in which a cylindrical electrode body is housed in a cylindrical can, and so on. The rectangular parallelepiped or nearly rectangular parallelepiped electrode body may include, for example, a laminated electrode body formed of a plurality of rectangular electrode sheets alternately laminated one on another with separators interposed therebetween, a flat wound electrode body formed of a pair of strip-shaped electrode sheets wound in a flat shape with strip-shaped separators interposed therebetween. As alternatives, the power storage device may further include a power storage device in which a single electrode body is housed in a can and also a power storage device in which multiple electrode bodies are housed together in a can.

The electrode sheets may include for example a positive electrode sheet provided with a positive active material layer on each of main surfaces of a current collecting foil, a negative electrode sheet provided with a negative active material layer on each of main surfaces of a current collecting foil, and also an electrode sheet for bipolar batteries, provided with a positive active material layer on one of main surfaces of a current collecting foil and a negative active material layer on the other main surface.

The outer surfaces of the electrode body include, for the laminated electrode body, a pair of principal flat surfaces (thickness-direction outside surfaces) located outside in the thickness direction of the laminated electrode sheets and end surfaces connecting the pair of principal flat surfaces. For the wound electrode body, the outer surfaces include an outer peripheral surface (thickness-direction outside surfaces) located around a winding axis and axial-direction end surfaces located on both sides in the axial direction of the winding axis.

The thickness-direction outside surface of the outer surfaces corresponds to the face of the electrode sheet, located outside in the thickness direction. For the laminated electrode body, the pair of principal flat surfaces each correspond to the thickness-direction outside surface. For the wound electrode body, the outer peripheral surface corresponds to the thickness-direction outside surface. When the wound electrode body has a flat shape, the outer peripheral surface (the thickness-direction outside surface) includes a pair of principal flat surfaces and a pair of semi-cylindrical surfaces connecting the principal flat surfaces.

The fixing surface of the thickness-direction outside surface is a portion to which the electrode-body bonding portion of the movement restricting member is bonded. The fixing surface can be a whole area of the thickness-direction outside surface or alternatively a partial area of the thickness-direction outside surface.

Further, in the foregoing power storage device, the can may include: a can body having a bottomed tubular shape with an opening, the can body being configured to house the electrode and the movement restricting member; and a can lid closing the opening of the can body, and the can fixing portion of the movement restricting member may extend from the electrode-body bonding portion toward a can corner defined by the can body and the can lid, and is fixed to the can body and the can lid in the can corner.

In the foregoing power storage device, the can fixing portion of the movement restricting member is fixed to the can body and the can lid in the can corner defined by the can lid and the can body. Thus, this can fixing portion does not move in the can corner. This configuration can efficiently prevent the movement restricting member and the electrode body bonded thereto from moving in the can.

Still further, in the foregoing power storage device, the can body may include: a can-body corner portion defining the can corner; and an engagement portion that is formed in the can-body corner portion and engages the can fixing portion of the movement restricting member, and the can body and the can lid may be configured such that the opening of the can body is closed with the can lid, and the can fixing portion of the movement restricting member is directly or indirectly fixed between the engagement portion of the can-body corner portion and the can lid.

In the foregoing power storage device, the opening of the can body is closed with the can lid and further the can fixing portion of the movement restricting member is fixed between the can lid and the engagement portion of the can-body corner portion of the can body. The thus configured power storage device enables fixation of the can fixing portion to the can with a simple fixing structure for fixing the can fixing portion between the engagement portion of the can body and the can lid.

Furthermore, the foregoing power storage device may be provided with a first spacer interposed between the can fixing portion of the movement restricting member and the engagement portion of the can-body corner portion and a second spacer interposed between the can fixing portion and the can lid, and the can body and the can lid may be configured such that the can fixing portion of the movement restricting member is fixed, through the first spacer and the second spacer, to between the engagement portion of the can-body corner portion and the can lid.

In the above-mentioned power storage device, the can fixing portion of the movement restricting member is fixed between the engagement portion of the can body and the can lid with the first and second spacers interposed therebetween. These first and second spacers interposed as above enable more reliable fixation of the can fixing portion to the can.

In any one of the foregoing power storage devices, the electrode body may include a separator interposed between the electrode sheets, and the electrode sheets and the separator are bonded to each other.

In the above-mentioned power storage device, the electrode sheets and the separator are integrally bonded, forming the electrode body. Thus, if the power storage device is subjected to external shocks or impacts, the electrode body is apt to move as an integral electrode body in the can. For this reason, restricting movement of the electrode body with the movement restricting member can particularly achieve significant effects as mentioned above.

DETAILED DESCRIPTION OF THE EXEMPLARY EMBODIMENTS

Figure 1:
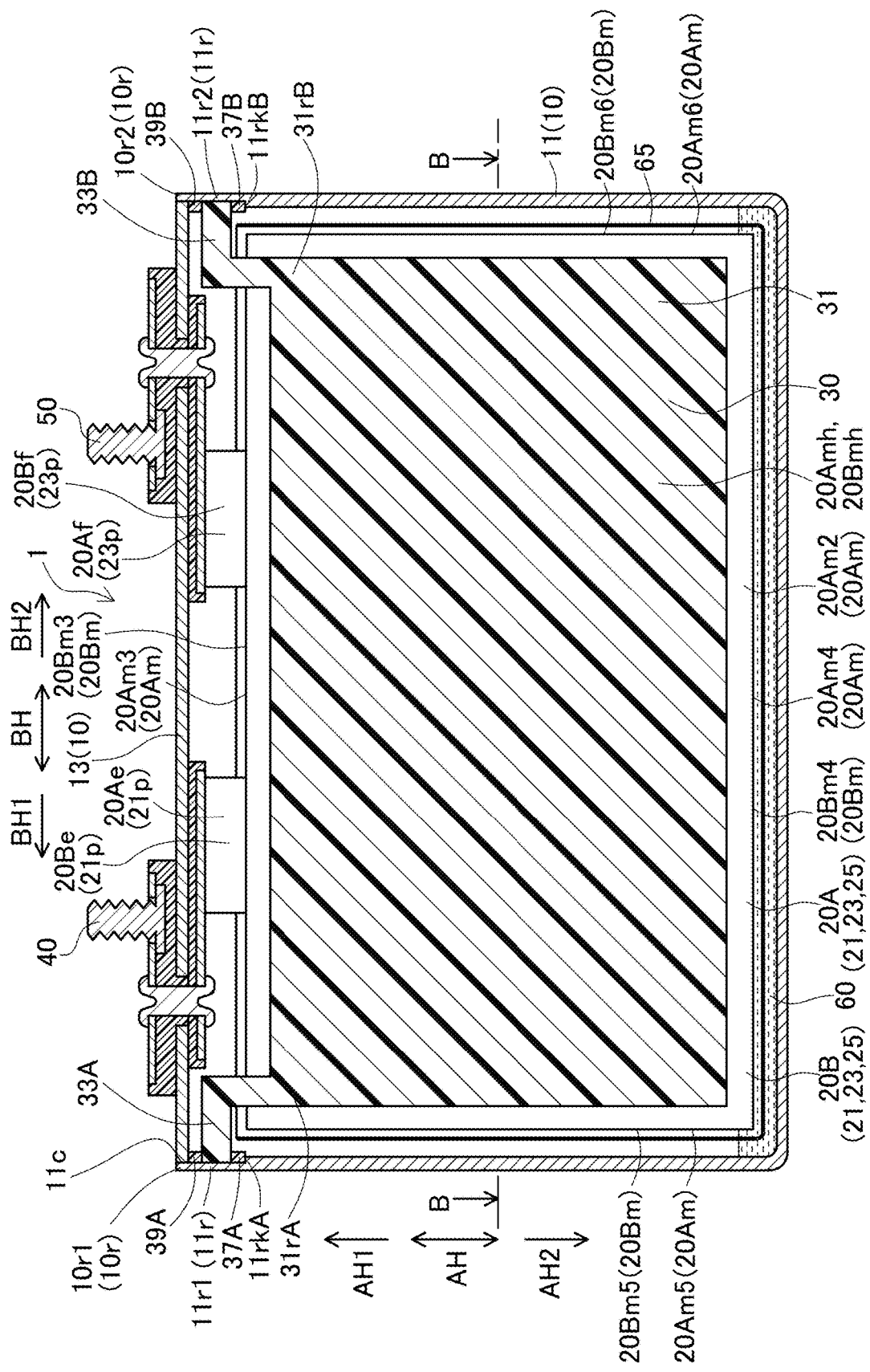
FIG. 1 is a cross-sectional view of a battery in a vertical direction and a lateral direction in an embodiment, cut along an A-A line in FIG. 2.
Figure 2:
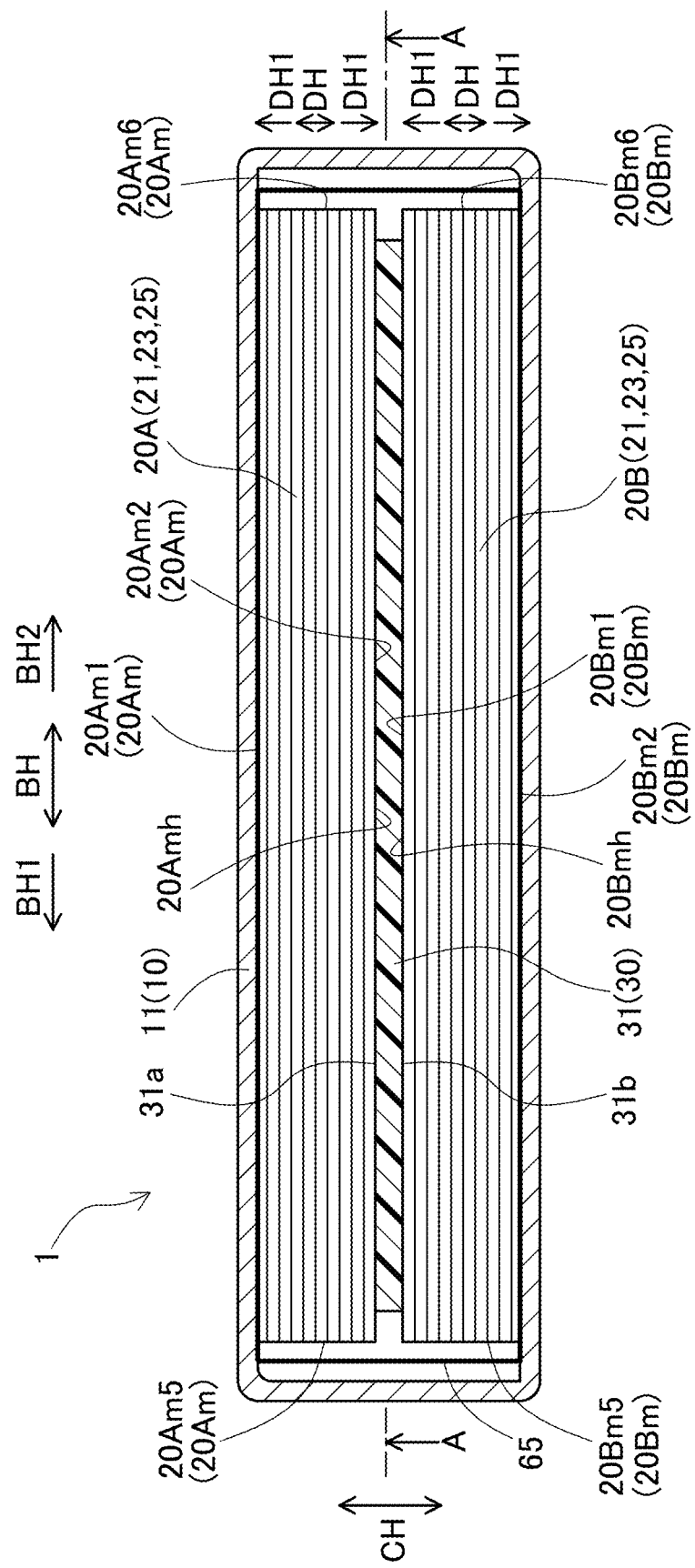
FIG. 2 is a cross-sectional view of the battery in the lateral direction and a thickness direction in the embodiment, cut along a B-B line in FIG. 1.
Figure 3:
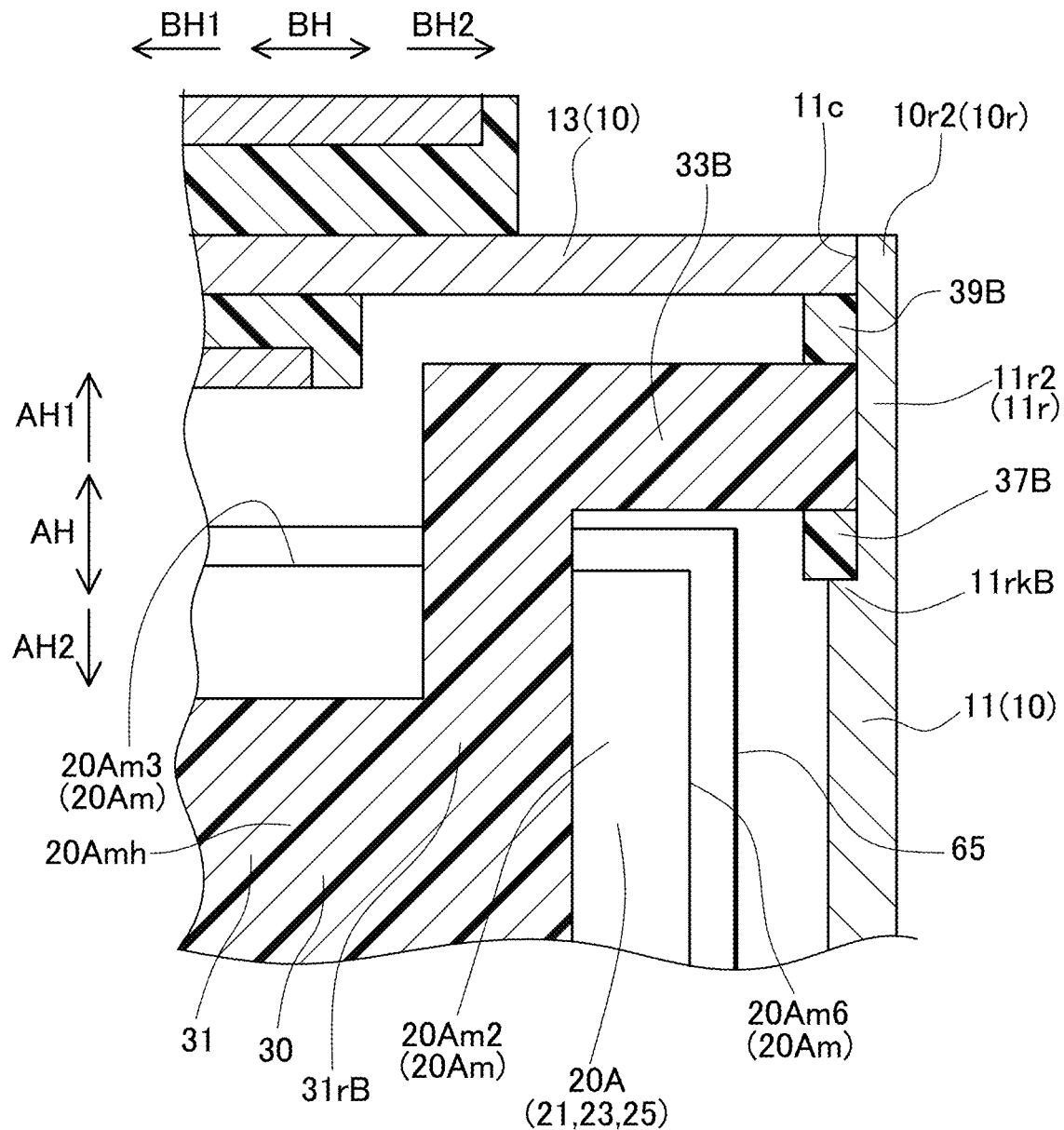
FIG. 3 is an enlarged cross-sectional view of the battery in the embodiment, near a can corner in FIG. 1.

A detailed description of an embodiment of this disclosure will now be given referring to the accompanying drawings. FIGS. 1 to 3 are cross-sectional views of a battery 1, corresponding to a power storage device, in the first embodiment. The vertical direction AH, the lateral direction BH, and the thickness direction CH of the battery 1 are defined as the directions indicated in FIGS. 1 to 3. This battery 1 is a sealed lithium-ion secondary battery, having a rectangular cross-section, which will be mounted in a vehicle, such as a hybrid car, a plug-in hybrid car, and an electric vehicle.

The battery 1 includes a can 10, a pair of electrode bodies 20A and 20B and a single movement restricting member 30, which are housed together in the can 10, a positive terminal 40 and a negative terminal 50 which are supported on the can 10, and others. Further, an electrolyte 60 is also contained in the can 10, so that a part of the electrolyte 60 is impregnated in the electrode bodies 20A and 20B and another part of the electrolyte 60 accumulates at the bottom of the can 10. The electrode bodies 20A and 20B and the movement restricting member 30 are covered with a bag-shaped insulating film 65 that is open on one side AH1 in the vertical direction AH.

The can 10 has a rectangular parallelepiped box shape, which is made of metal, for example, aluminum in the present embodiment. This can 10 is composed of a can body 11 having a bottomed rectangular tubular shape with an opening 11c on the one side AH1 in the vertical direction AH, and a can lid 13 having a rectangular plate shape, welded to the can body 11 to close the opening 11c. The can body 11 contains the electrode bodies 20A and 20B covered with the insulation film 65. The can lid 13 is provided with a safety valve (not shown) that can break open when the internal pressure of the can 10 reaches a predetermined pressure. The can lid 13 is further formed with a liquid inlet (not shown) that connects the inside and the outside of the can 10, and is hermetically sealed with a sealing member (not shown).

In addition, the positive terminal 40, consisting of a plurality of aluminum members, is fixed to the can lid 13 in an insulated state from the can lid 13. This positive terminal 40 is conductively connected to positive electrode tabs 20Ae and 20Be (which will be described later) of the electrode bodies 20A and 20B inside the can 10, while extending through the can lid 13 to the outside of the battery 1. Further, the negative terminal 50, consisting of a plurality of copper members, is fixed to the can lid 13 in an insulated state from the can lid 13. This negative terminal 50 is conductively connected to negative electrode tabs 20Af and 20Bf (which will be described later) of the electrode bodies 20A and 20B inside the can 10, while extending through the can lid 13 to the outside of the battery 1.

The pair of electrode bodies 20A and 20B are stacked in the thickness direction CH with the movement restricting member 30 interposed therebetween, and housed in the can 10. Each of the electrode bodies 20A and 20B is a laminated electrode body having a flat, rectangular parallelepiped or nearly rectangular parallelepiped shape, in which a plurality of rectangular positive electrode sheets (electrode sheets) 21 and a plurality of rectangular negative electrode sheets (electrode sheets) 23 are alternately 1 aminated with rectangular separators 25 interposed therebetween. The separators 25 are formed of porous films made of resin. Each positive electrode sheet 21 and each separator 25 overlapping one another in the thickness direction DH and each negative electrode sheet 23 and each separator 25 overlapping one another in the thickness direction DH are respectively bonded with an adhesive, so that each of the electrode bodies 20A and 20B is integrated.

The electrode bodies 20A and 20B are each rectangular parallelepiped or nearly rectangular parallelepiped as described above and respectively have outer surfaces 20Am and outer surfaces 20Bm, each including six flat surfaces in general. Specifically, the outer surfaces 20Am of the electrode body 20A include a pair of a first thickness-direction outside surface 20Am1 and a second thickness-direction outside surface 20Am2, each of which has a wider area and is located on the outside DH1 in the thickness direction DH of the positive electrode sheets 21 and the negative electrode sheets 23. The outer surfaces 20Am further include four surfaces, i.e., a top surface 20Am3, a bottom surface 20Am4, a first narrow lateral surface 20Am5, and a second narrow lateral surface 20Am6, which connect the first and second thickness-direction outside surfaces 20Am1 and 20Am2. Similarly, the outer surfaces 20Bm of the electrode body 20B include a pair of a first thickness-direction outside surface 20Bm1 and a second thickness-direction outside surface 20Bm2, each of which has a wider area and is located on the outside DH1 in the thickness direction DH of the positive electrode sheets 21 and the negative electrode sheets 23. The outer surfaces 20Bm further include four surfaces, i.e., a top surface 20Bm3, a bottom surface 20Bm4, a first narrow lateral surface 20Bm5, and a second narrow lateral surface 20Bm6, which connect the first and second thickness-direction outside surfaces 20Bm1 and 20Bm2.

The movement restricting member 30 includes a bonding portion 31 bonded to the electrode bodies 20A and 20B, which will be also referred to as an electrode-body bonding portion 31. This bonding portion 31 has two main surfaces; one is a main surface 31a bonded to a central portion of the second-thickness-direction outside surface 20Am2 of the outer surfaces 20Am of the electrode body 20A, excluding a peripheral portion, that is, to a fixing surface 20Amh, and the other is a main surface 31b bonded to a central portion of the first-thickness-direction outside surface 20Bm1 of the outer surfaces 20Bm of the electrode body 20B, excluding a peripheral portion, that is, to a fixing surface 20Bmh.

Each of the positive electrode sheets 21 includes a positive active material layer (not shown) on each main surface of a positive current collecting foil (not shown) made of a rectangular aluminum foil. The positive active material layer consists of positive active material particles that can absorb and release lithium ions, conductive particles, and a binding agent. Of each positive electrode sheet 21, an extension part extending on the one side AH1 in the vertical direction AH is a positive-electrode exposed portion 21p including no positive active material layer in the thickness direction DH, in which the positive current collecting foil is exposed in the thickness direction DH. The positive-electrode exposed portions 21p of the positive electrode sheets 21 overlap one another in the thickness direction DH, forming the positive electrode tabs 20Ae and 20Be mentioned above. These positive electrode tabs 20Ae and 20Be are electrically connected to the positive terminal 40 in the foregoing manner.

Each of the negative electrode sheets 23 includes a negative active material layer (not shown) on each main surface of a negative current collecting foil made of a rectangular copper foil. The negative active material layer consists of negative active material particles that can absorb and release lithium ions, and a binding agent. Of each negative electrode sheet 23, an extension part extending on the one side AH1 in the vertical direction AH is a negative-electrode exposed portion 23p including no negative active material layer in the thickness direction DH, in which the negative current collecting foil is exposed in the thickness direction DH. The negative-electrode exposed portions 23p of the negative electrode sheets 23 overlap one another in the thickness direction DH, forming the negative electrode tabs 20Af and 20Bf mentioned above. These negative electrode tabs 20Af and 20Bf are electrically connected to the negative terminal 50 in the foregoing manner.

Figure 4:
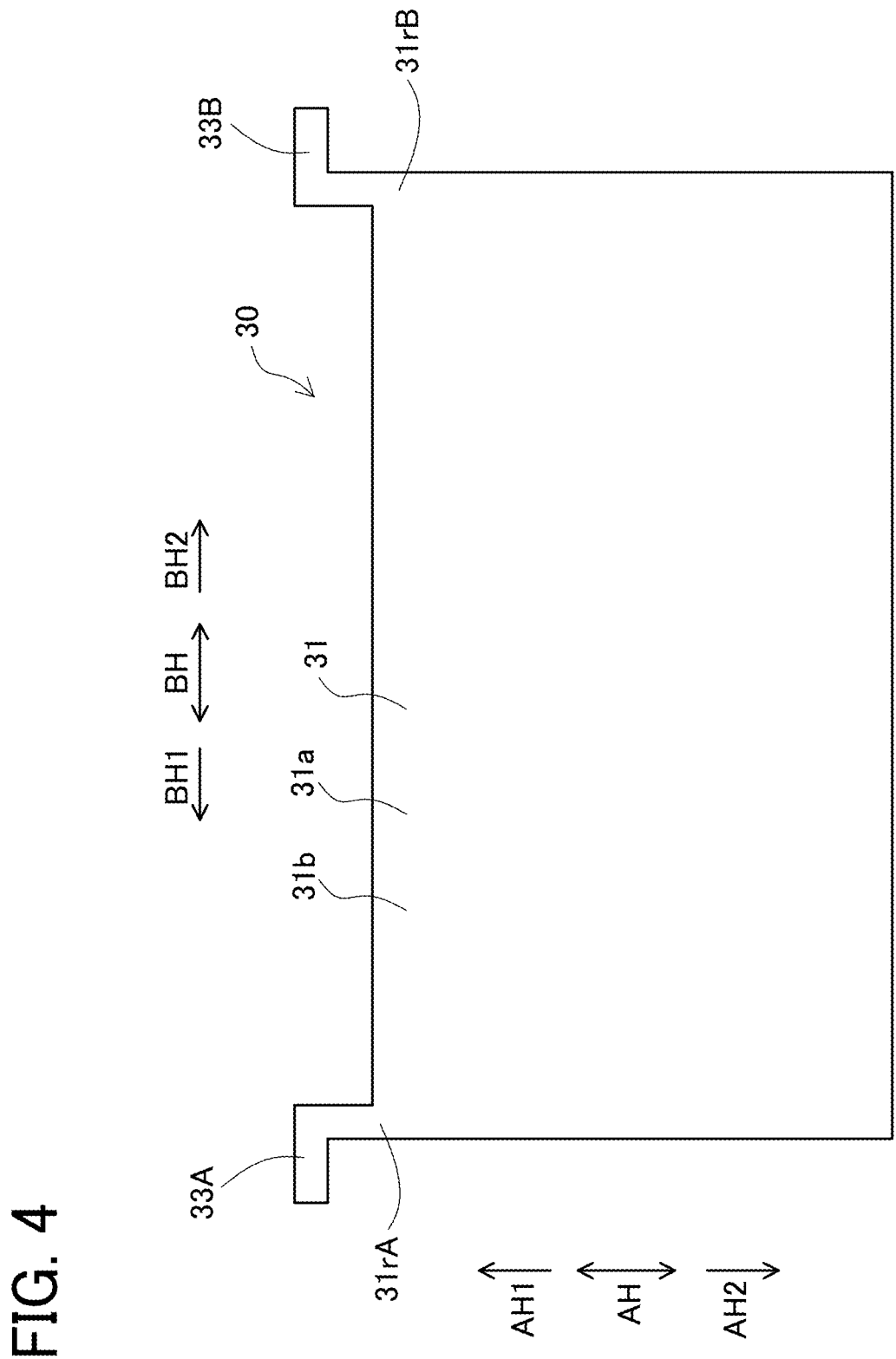
FIG. 4 is a plan view of a movement restricting member in the embodiment.

The following description is given to the movement restricting member 30, referring to FIG. 4 in addition to FIGS. 1 to 3. This movement restricting member 30 is a flat plate made of insulating resin, which is polypropylene in the present embodiment. The movement restricting member 30 includes the electrode-body bonding portion 31 having a rectangular plate shape and two can fixing portions 33A and 33B each extending from this bonding portion 31. Specifically, the one can fixing portion 33A extends from a corner portion 31rA of the bonding portion 31 located on one side BH1 in the lateral direction BH and the one side AH1 in the vertical direction AH toward a one-side can corner 10r1 located on the one side BH1 in the lateral direction BH, out of can corners 10r defined by the can body 11 and the can lid 13. The other can fixing portion 33B extends from a corner portion 31rB of the bonding portion 31 located on the other side BH2 in the lateral direction BH and the one side AH1 in the vertical direction AH toward the other-side can corner 10r2 located on the other side BH2 in the lateral direction BH, out of the of the can corners 10r.

To the main surfaces 31a and 31b of the electrode-body bonding portion 31, the electrode bodies 20A and 20B are respectively bonded. To be concrete, as described above, the fixing surface 20Amh of the second-thickness-direction outside surface 20Am2 of the outer surfaces 20Am of the one electrode body 20A is bonded to the main surface 31a of the bonding portion 31. The fixing surface 20Bmh of the first-thickness-direction outside surface 20Bm1 of the outer surfaces 20Bm of the other electrode body 20B is bonded to the main surface 31b of the bonding portion 31. Accordingly, the bonding portion 31 is interposed between and integral with the two electrode bodies 20A and 20B arranged in a row in the thickness direction CH.

In contrast, the can fixing portions 33A and 33B are fixed to the can 10 to restrict movement of the electrode bodies 20A and 20B inside the can 10. That is, as described above, the one can fixing portion 33A extends from the corner portion 31rA of the electrode-body bonding portion 31 toward the one-side can corner 10r1 of the can corners 10r and is fixed to the can body 11 and the can lid 13 at the one-side can corner 10r1. Further, as described above, the other can fixing portion 33B extends from the corner portion 31rB of the electrode-body bonding portion 31 toward the other-side can corner 10r2 of the can corners 10r and is fixed to the can body 11 and the can lid 13 at the other-side can corner 10r2.

Specifically, the can-body corner portions 11r forming the can corners 10r of the can body 11 are provided with engagement portions 11rkA and 11rkB, which respectively engage the can fixing portions 33A and 33B of the movement restricting member 30. The one engagement portion 11rkA is provided at a one-side can-body corner portion 11r1 of the can-body corner portions 11r of the can body 11 so that the one engagement portion 11rkA is located on the one side BH1 in the lateral direction BH, protruding in a stepwise manner on the other side BH2 in the lateral direction BH and engaging the can fixing portion 33A of the movement restricting member 30 from the other side AH2 in the vertical direction AH. Further, the other engagement portion 11rkB is provided at the other-side can-body corner portion 11r2 of the can-body corner portions 11r of the can body 11 so that the other-side can-body corner portion 11r2 is located on the other side BH2 in the lateral direction BH, protruding in a stepwise manner on the one side BH1 in the lateral direction BH and engaging the can fixing portion 33B of the movement restricting member 30 from the other side AH2 in the vertical direction AH.

Further, first spacers 37A and 37B made of insulation resin (polypropylene in the present embodiment) are respectively interposed between the can fixing portion 33A of the movement restricting member 30 and the engagement portion 11rkA of the can body 11 and between the can fixing portion 33B of the movement restricting member 30 and the engagement portion 11rkB of the can body 11. In addition, second spacers 39A and 39B made of insulation resin (polypropylene in the present embodiment) are respectively interposed between the can fixing portion 33A of the movement restricting member 30 and the can lid 13 and between the can fixing portion 33B of the movement restricting member 30 and the can lid 13. The can body 11 and the can lid 13 are configured such that the can fixing portion 33A of the movement restricting member 30 is fixed between the engagement portion 11rkA of the can-body corner portion 11r and the can lid 13 through the first spacer 37A and the second spacer 39A, and also the can fixing portion 33B of the movement restricting member 30 is fixed between the engagement 11rkB of the can-body corner portion 11r and the can lid 13 through the first spacer 37B and the second 39B.

The movement restricting member 30 configured as above includes the electrode-body bonding portion 31 bonded to the fixing surfaces 20Amh and 20Bmh of the electrode bodies 20A and 20B, and the can fixing portions 33A and 33B each extending from the electrode-body bonding portion 31 and fixed to the can 10 to restrict movement of the electrode bodies 20A and 20B in the can 10. Therefore, even if the battery 1 provided with the movement restricting member 30 is subjected to external shocks, the electrode bodies 20A and 20B are restricted from moving within the can 10. The thus configured battery 1 can prevent the electrode bodies 20A and 20B from colliding against the inner wall surface of the can 10, thus preventing damages to the electrode bodies 20A and 20B themselves, damages to the connected portions of the electrode bodies 20A and 20B with the positive terminal 40 or the negative terminal 50, that is, the positive electrode tabs 20Ae and 20Be, negative electrode tabs 20Af and 20Bf, and others, and also damages to the can 10.

In the present embodiment, furthermore, the can fixing portions 33A and 33B of the movement restricting member 30 are fixed to the can body 11 and the can lid 13 in the can corners 10r, so that those can fixing portions 33A and 33B do not move, in the can corners 10r, in the vertical direction AH nor in the lateral direction BH. Accordingly, the movement restricting member 30 and the electrode bodies 20A and 20B bonded thereto can be effectively restrained from moving within the can 10 in the vertical direction AH and in the lateral direction BH.

In the present embodiment, the opening 11c of the can body 11 is closed with the can lid 13 and also the can fixing portions 33A and 33B of the movement restricting member 30 are fixed between the corresponding engagement portion 11rkA or 11rkB of the can body 11 and the can lid 13. In the thus configured battery 1, the can fixing portions 33A and 33B are fixed to the can 10 with such a simple fixing structure that the can fixing portions 33A and 33B are respectively fixed between the engagement portion 11rkA of the can body 11 and the can lid 13 and between the engagement portion 11rkB and the can lid 13.

Furthermore, the can fixing portion 33A and 33B of the movement restricting member 30 are fixed, respectively through the first spacer 37A and the second spacer 39A and through the first spacer 37B and the second spacer 39B, between the engagement portion 11rkA or 11rkB of the can body 11 and the can lid 13. Since those first spacers 37A and 37B and second spacers 39A and 39B are interposed as above, the can fixing portions 33A and 33B can be more reliably fixed to the can 10.

In the present embodiment, the positive electrode sheet 21 and the negative electrode sheet 23 are integrally bonded to the separators 25, constituting each electrode body 20A and 20B. If the battery 1 is subjected to external shocks, therefore, each of the electrode bodies 20A and 20B is liable to move, as an integral electrode body, in the can 10. Thus, the above-mentioned effect can be significantly achieved by the movement restricting member 30 that restricts the movement of the electrode bodies 20A and 20B.

Next, a method for producing the battery 1 configured as above will be described below. The can lid 13 is first prepared and the positive terminal 40 and the negative terminal 50 are fixedly placed on the can lid 13 (see FIG. 1). Separately, the movement restricting member 30 is prepared, and the two electrode bodies 20A and 20B produced separately are bonded to the corresponding main surfaces 31a and 31b of the electrode-body bonding portion 31 with an adhesive. The positive terminal 40 and the negative terminal 50 fixed to the can lid 13 are respectively welded to the positive electrode tabs 20Ae and 20Be and the negative electrode tabs 20Af and 20Bf of the electrode bodies 20A and 20B having been bonded to the movement restricting member 30. Then, the electrode bodies 20A and 20B and the movement restricting member 30 are entirely covered with the bag-shaped insulation film 65.

Subsequently, the can body 11 is prepared, and the electrode bodies 20A and 20B and the movement restricting member 30 covered with the insulation film 65 are inserted into the can body 11 and then the opening 11c of the can body 11 is closed with the can lid 13. At that time, the first spacer 37A is placed between the engagement portion 11rkA of the can body 11 and the can fixing portion 33A of the movement restricting member 30 and also the first spacer 37B is placed between the engagement portion 11rkB and the can fixing portion 33B. Furthermore, the second spacer 39A is placed between the can fixing portion 33A of the movement restricting member 30 and the can lid 13 and also the second spacer 39B is placed between the can fixing portion 33B and the can lid 13. Accordingly, the can fixing portions 33A and 33B of the movement restricting member 30 are fixed between the corresponding engagement portion 11rkA or 11rkB of the can-body corner portions 11r and the can lid 13, through the first spacer 37A or 37B and the second spacer 39A or 39B. Then, the can body 11 and the can lid 13 are welded together along the entire circumference of the can lid 13, completing the can 10.

Subsequently, the electrolyte 60 is injected into the can 10 through a liquid inlet (not shown) of the can lid 13 and further this liquid inlet is sealingly closed with a sealing member (not shown). This battery 1 is then subjected to initial charge, aging, various tests, and others. The battery 1 is thus completed.

The present disclosure is described in the foregoing embodiment, but the embodiment gives no limitation to the present disclosure. Thus, the present disclosure may be embodied in other specific forms without departing from the essential characteristics thereof.

For example, the embodiment exemplifies that two electrode bodies 20A and 20B are bonded to a single movement restricting member 30, but it is not limited thereto. For instance, two movement restricting members may be bonded one to each of the electrode bodies 20A and 20B.

In the embodiment, the movement restricting member 30 is placed between the two electrode bodies 20A and 20B. As an alternative, a movement restricting member may be placed between each of the electrode bodies 20A and 20B and the can 10.

In the embodiment, the movement restricting member 30 is bonded to the electrode bodies 20A and 20B with an adhesive, but the bonding method is not limited thereto. For example, the movement restricting member 30 may be bonded to the electrode bodies 20A and 20B by heat welding using a hot press with a thermoplastic resin, such as polyvinylidene fluoride (PVDF).

The embodiment exemplifies the battery 1 in which two electrode bodies 20A and 20B are housed in the can 10. Besides, the number of electrode bodies may be one or may be three or more.

The embodiment exemplifies the battery 1 in which the laminated electrode bodies 20A and 20B are housed in the can 10. As alternatives, a battery may be configured such that a flat wound electrode body or bodies is housed in a can.

The embodiment exemplifies the battery 1 in which the rectangular parallelepiped or nearly rectangular parallelepiped electrode bodies 20A and 20B are housed in the rectangular parallelepiped box-shaped can 10. As alternatives, a battery may be configured such that a movement restricting member bonded to a peripheral surface of a cylindrical wound electrode body or bodies (a thickness-direction outside surface or surfaces) is housed in a cylindrical can.

REFERENCE SIGNS LIST

1 Battery (Power storage device)
10 Can
10r Can corner
11 Can body
11c Opening
11r Can-body corner portion
11rkA, 11rkB Engagement portion
13 Can lid
20A, 20B Electrode body
20Am, 20Bm Outer surface
20Am1, 20Bm1 First thickness-direction outside surface
20Am2, 20Bm2 Second thickness-direction outside surface
20Amh, 20Bmh Fixing surface
21 Positive electrode sheet (Electrode sheet)
23 Negative electrode sheet (Electrode sheet)
25 Separator
30 Movement restricting member
31 Electrode-body bonding portion
33A, 33B Can fixing portion
37A, 37B First spacer
39A, 39B Second spacer
40 Positive terminal
50 Negative terminal
DH Thickness direction (of Electrode sheet)
DH1 Outside (in Thickness direction)

What is claimed is:

1. A power storage device comprising:
a can;
an electrode body housed in the can, the electrode body including electrode sheets; and
wherein
the electrode body has outer surfaces including a thickness-direction outside surface located outside in a thickness direction of the electrode sheets, and
the power storage device further comprises:
a movement restricting member placed in the can, the movement restricting member including:
an electrode-body bonding portion bonded to a fixing surface that is at least a part of the thickness-direction outside surface; and
a can fixing portion that extends from the electrode-body bonding portion and is fixed to the can to restrict movement of the electrode body in the can,
the can includes:
a can body having a bottomed tubular shape with an opening, the can body being configured to house the electrode and the movement restricting member; and
a can lid closing the opening of the can body, and
the can fixing portion of the movement restricting member extends from the electrode-body bonding portion toward a can corner defined by the can body and the can lid, and is fixed to the can body and the can lid in the can corner.

2. The power storage device according to claim 1, wherein the can body includes:
a can-body corner portion defining the can corner; and
an engagement portion that is formed in the can-body corner portion and engages the can fixing portion of the movement restricting member, and
the can body and the can lid are configured such that
the opening of the can body is closed with the can lid, and the can fixing portion of the movement restricting member is directly or indirectly fixed between the engagement portion of the can-body corner portion and the can lid.

* * * * *